(12) United States Patent
Corry et al.

(10) Patent No.: US 7,792,918 B2
(45) Date of Patent: Sep. 7, 2010

(54) MIGRATION OF A GUEST FROM ONE SERVER TO ANOTHER

(75) Inventors: Kevin M. Corry, Pflugerville, TX (US); Mark A. Peloquin, Austin, TX (US); Steven L. Pratt, Leander, TX (US); Karl M. Rister, Austin, TX (US); Andrew M. Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 12/204,118

(22) Filed: Sep. 4, 2008

(65) Prior Publication Data

US 2010/0057881 A1    Mar. 4, 2010

(51) Int. Cl.
G06F 15/167    (2006.01)

(52) U.S. Cl. .................... 709/216; 709/227

(58) Field of Classification Search .......... 709/215, 709/216, 230, 208, 223, 227
See application file for complete search history.

(56) References Cited

U.S. PATENT DOCUMENTS

| | | | |
|---|---|---|---|
| 6,802,062 B1 * | 10/2004 | Oyamada et al. ............ | 719/319 |
| 2008/0059556 A1 * | 3/2008 | Greenspan et al. .......... | 709/220 |
| 2008/0080514 A1 * | 4/2008 | Louzoun et al. ............ | 370/394 |
| 2008/0222375 A1 * | 9/2008 | Kotsovinos et al. ......... | 709/230 |
| 2009/0077552 A1 * | 3/2009 | Sekiguchi et al. ........... | 718/1 |
| 2009/0144389 A1 * | 6/2009 | Sakuta ........................ | 709/215 |

OTHER PUBLICATIONS http://www.infoster.com/display_article/300552/23/ARTCL/none/mpme/Server-virtualization:-The-case-for-iSCSI/; "Server Virtualization: The case for iSCSI," Jul. 2007, pp. 1-6.
http://northstarlabs.net/2007/05/31/xen-san-lvm-and-host-tagging/; "Xen, SAN, LVM and host tagging," NorthStar Labs, Jeff McCune versus Technology, May 31, 2007, pp. 1-2.
http://72.14.235.104/search?q=cache:QTGxOtCSxBYJ:searchvmware.techtarget.com/tip/0.289483,sid179_gci1280406,00.html+%22The+memory+map+of+the+guest+operating+system+is+transferred+to+the+new+host%22&hl=en&ct=clnk&cd=1&client=opera&strip=1; VMWare Platforms, VMware Tips: Tips & Newsletters Topics, "VMware Infrastructure Suite: Why go all the way," Craig A. Newell & Barb Goldworm, contributors, Oct. 31, 2007; pp. 1-3.
Christopher Clark et al., "Live Migration of Virtual Machines," Proceedings of the 2$^{nd}$ Symposium on Networked Systems Design & Implementation (NSDI'05), Boston, MA, USA, May 2-4, 2005, pp. 1-14.

* cited by examiner

Primary Examiner—Ramy M Osman
(74) Attorney, Agent, or Firm—Steven L. Bennett; Schubert Law Group PLLC

(57) ABSTRACT

Systems, methods and media for migration of a guest from one server to another are disclosed. In one embodiment, a first server, while hosting the guest, receives a signal from the second server that the migration is to occur. The first server presents the memory used by the guest as a virtual disk. The second server accesses this disk and copies its contents to the second server over the storage area network. The first server suspends operation of the guest, and after the memory of the guest is copied to the second server, the second server resumes operation of the guest.

18 Claims, 3 Drawing Sheets

MIGRATION OF A GUEST FROM ONE SERVER TO ANOTHER

BACKGROUND

This written description is in the field of migration of a guest from one server to another. More particularly, the description relates to transferring memory of the guest over a storage area network.

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, and accounting. Further, networks enable high speed communication between people in diverse locations by way of e-mail, websites, instant messaging, and web-conferencing.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Thus, in a modern system, a plurality of computers—including servers—are connected together through a network. Each computer may run application programs for performing certain functions. These application programs may include word-processing, e-mail, graphics, document viewing and mark-up, spreadsheet, database, music player, internet browser, photo-shop, games, anti-virus, as well as a host of other application programs too numerous to mention.

Servers are provided to connect a plurality of computers to the Internet or an intranet. Each server in a network may be logically partitioned into a plurality of virtual clients or guests which may act and appear to a computer connected to the server as if the virtual client is itself a server. A guest may be an executing operating system and possibly additionally an application program such as a database. Each guest or virtual client may have access to memory internal to the server and external to the server such as in a Storage Area Network (SAN). To provide this access a Hypervisor (HYP) controls access of each guest or virtual client to the physical storage.

In many systems, there will be multiple servers connected together and to a computer communications network and to a storage area network. Multiple servers can serve more users on the network. Moreover each server can host different functions. Multiple servers may communicate to each other and to user computers over a network typically connected by Ethernet cable and network processors. Thus, in a typical system, many servers are connected with each other and to other computers on a computer communications network, and are also connected to each other on a storage area network (SAN).

The computer communications network is typically an Ethernet channel. The Ethernet network is a primary means by which servers communicate with computers in the network. The SAN typically comprises a fiber channel or other high bandwidth channel. Servers may be found in groups with as many as thousands of servers in a group. In such a group, there are storage servers and there are "computing" servers. Storage servers comprise multiple hard disks and mediate access to the memory on its hard disks. Computing servers are the other non-storage servers in the network such as those that provide access to their files over the Ethernet in response to requests from computers in the network.

In many systems, it is desirable and necessary to transfer operation of a guest from one computing server to another. A guest is an entity executing within a logical partition on a server that comprises at least an operating system and possibly application programs. One may wish to make the transfer due to maintenance on the first server or to balance the computing load between servers. To transfer operation of the guest from a first server to a second server, one must transfer the memory of the guest from the first server to the second server, suspend operation of the guest on the first server, and commence operation of the guest on the second server. Typically, migration of the memory of the guest from a partition of one server to a partition of another server occurs over the Ethernet using TCP/IP (Transmission Control Protocol/Internet Protocol). The time to accomplish this migration can be very long because of the relatively slow speed of the Ethernet and the large processing overhead time required to process the TCP/IP protocol.

BRIEF SUMMARY

The present invention provides systems, methods and media for migrating a guest from one server to another using a storage area network to transfer the memory of the guest. One embodiment comprises a first server to migrate a guest operating on the first server to a second server, the first and second server being in the same computer communications network over an Ethernet channel and in the same storage area network over a fiber channel. The first server comprises a memory allocated to store data of the guest on the first server. A network adapter receives over the communications network a signal from the second server indicating that a guest migration operation is to be performed. A processor executes hypervisor computer code comprising a migration program and to execute code of the guest. The migration program executing on the processor presents the memory allocated to the guest as a virtual disk and enables the second server to access the virtual disk on the first server over the storage area network.

Another embodiment is a method for migrating a guest from a first server to a second server in a storage area network (SAN) and in a computer communications network. The method comprises signaling to the first server over the computer communications network that operation of a guest on the first server is to be migrated to the second server. The method comprises creating a virtual disk on the first server having memory being used by the guest on the first server. The method further comprises copying the contents of the virtual disk from the first server to the second server over the storage area network. The method further comprises suspending operation of the guest on the first server, and when copying of the contents of the virtual disk is completed, resuming operation of the guest on the second server.

Another embodiment is a computer program product comprising a computer useable medium having a computer readable program, wherein the computer readable program when executed on a first server causes the server computer to migrate a guest to a second server. The operations comprise receiving a signal from the second server over a computer communications network that operation of the guest on the first server is to be migrated to the second server. The operations further comprise creating on the first server a virtual disk having memory being used by the guest on the first server. The operations further comprise copying the contents of the virtual disk from the first server to the second server over a storage area network. The server suspends operation of the guest on the first server.

BRIEF DESCRIPTION OF THE SEVERAL VIEWS OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments depicted in the accompanying drawings. However, the amount of detail offered is not intended to limit the anticipated variations of embodiments; but, on the contrary, the intention is to cover all modifications, equivalents, and alternatives falling within the spirit and scope of the appended claims. The detailed description below is designed to render various embodiments obvious to a person of ordinary skill in the art. While specific embodiments will be described herein with reference to particular configurations, those of skill in the art will realize that embodiments may advantageously be implemented with other substantially equivalent circuit configurations and elements.

Systems, methods and media for migration of a guest from one server to another are disclosed. In one embodiment, a first server, while hosting the guest, receives a signal from the second server that the migration is to occur. The first server presents the memory used by the guest as a virtual disk. The second server accesses this disk and copies its contents to the second server over the storage area network. The first server suspends operation of the guest, and after the memory of the guest is copied to the second server, the second server resumes operation of the guest.

Figure 1:
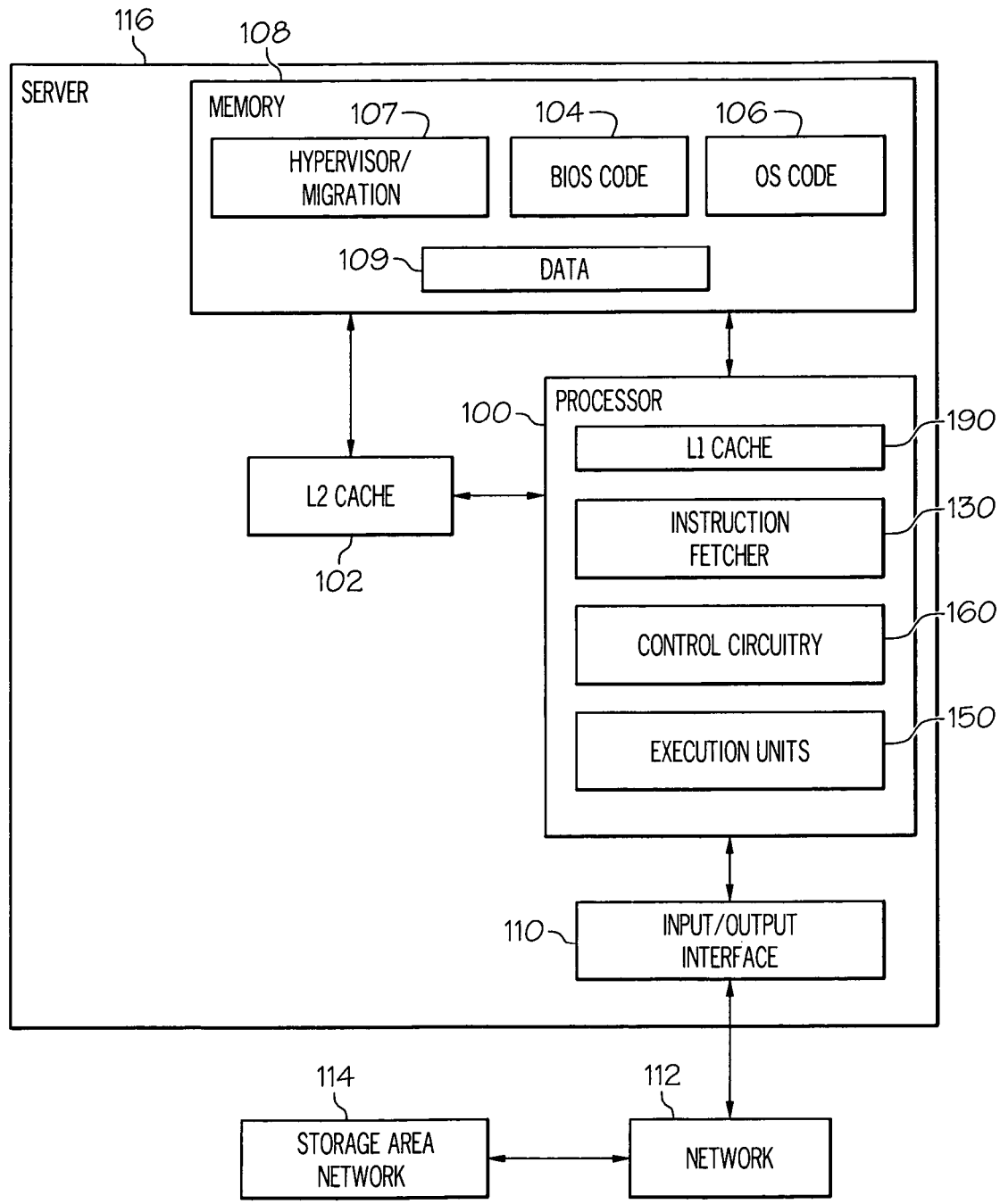
FIG. 1 depicts an embodiment of a server within a network; the server can host a guest and participate in the migration of the guest by transferring the guest memory over a storage area network.

FIG. 1 shows a server 116 (herein sometimes referred to as a machine). Server 116 comprises at least one processor 100 that can operate according to BIOS (Basic Input/Output System) Code 104 and Operating System (OS) Code 106. The BIOS and OS code is stored in memory 108. The BIOS code is typically stored on Read-Only Memory (ROM) and the OS code is typically stored on the hard drive of server 116. Digital system 116 comprises a level 2 (L2) cache 102 located physically close to processor 100. Memory 108 also stores other programs for execution by processor 100 and stores data 109.

In an embodiment, memory 108 stores hypervisor code 107 which comprises hypervisor management applications including a migration application for migrating a guest from a first server to a second server. A hypervisor will control access to a memory of the server and ensure that each partition executing software on the server will access only the memory allocated to it. A hypervisor has direct control over input/output (I/O), is responsible for hosting the I/O to other guests, and responsible for executing hypervisor management applications, such as a migration application.

The hypervisor code 107 comprises a migration application and a device driver. The migration application will control access to a server's memory by another server. The device driver will emulate a virtual disk containing the memory of the guest. The migration application on a first server will allow a second server to access memory of the first server to obtain a copy of the memory of a guest on a partition of the first server. The memory is transferred over the storage area network. Thus, in an embodiment, hypervisor code 107 is executed by processor 100 of server 116 and may control when and how much time of the processor is obtained by each guest executing on server 116. Indeed, hypervisor code 107, when executed by processor 100 of server 116, may preempt any guest from using the processor when the processor is needed by the hypervisor. Further, hypervisor code 107 controls the access of each guest to other memory 109 of server 116.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. In a superscalar architecture, different execution units operate in parallel. Thus, execution units 150 comprise a set of units of different types operating in parallel to execute instructions to implement an encryption key management process.

Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

Server 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Processor 100 may also communicate with a network 112 by way of Input/Output Device 110. The network connects server 116 with a storage area network of physical memory storage devices 114. These devices may include tape drive storage or hard disk arrays or other types of memory.

Thus, in one mode of operation of server 116, the L2 cache receives from memory 108 data and instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include load and store instructions, branch instructions, arithmetic logic instructions, floating point instructions, etc. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Each of the units of execution units 150 may be adapted to execute a specific set of instructions. Instructions can be submitted to different execution units for execution in parallel. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

A server 116 will have its own memory for storing its operating system, BIOS, and the code for executing application program and encryption key processing code, as well as files and data. The memory of a server comprises Read-Only-Memory (ROM), cache memory implemented in DRAM and SRAM, a hard disk drive, CD drives and DVD drives. A server also has its own memory and may control access to other memory such as tape drives and hard disk arrays. Each server may store and execute its own application programs. Thus, some application programs, such as databases, may reside in the server and these programs may be available to computers in the network.

Figure 2:
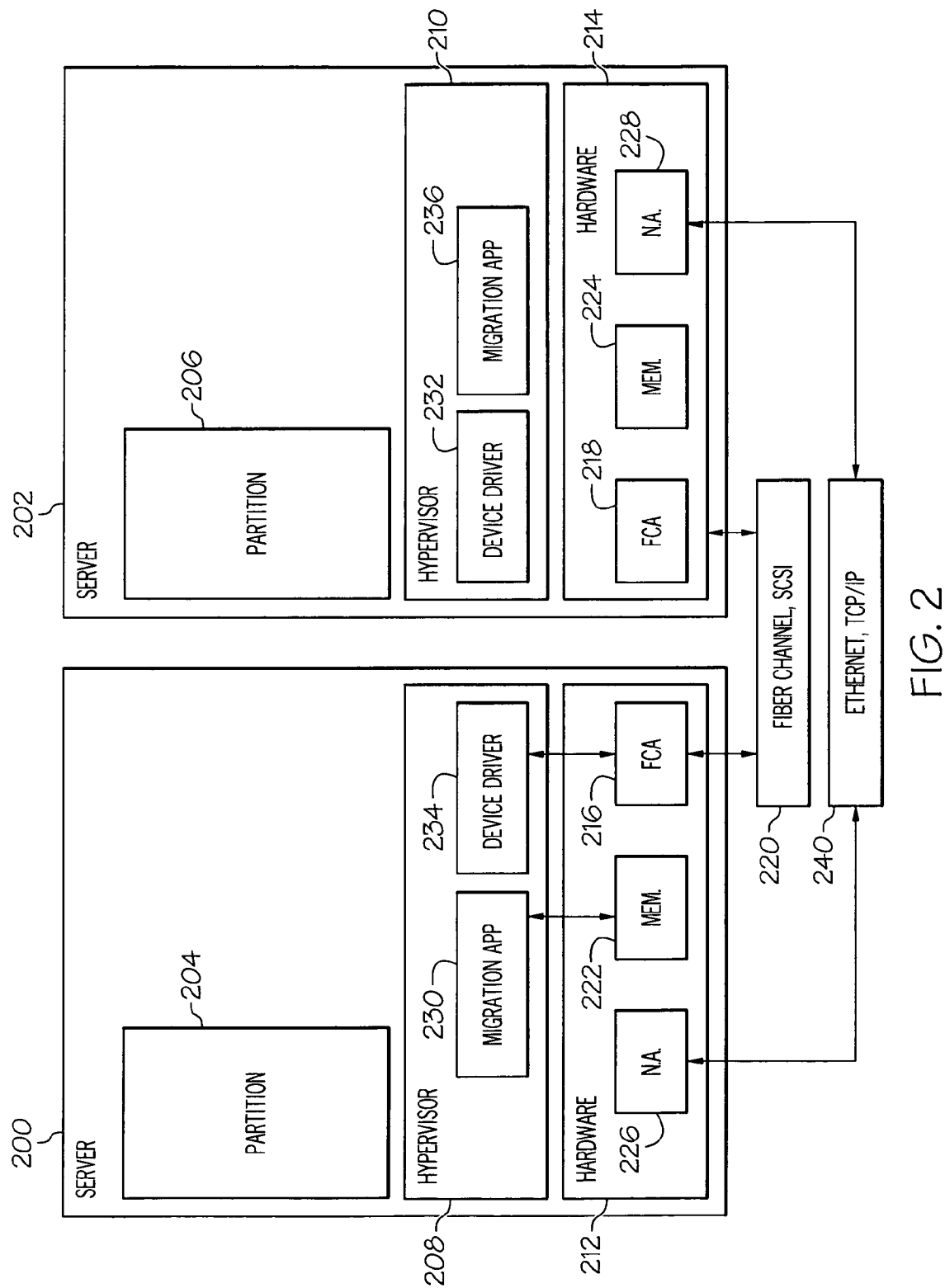
FIG. 2 depicts two computing servers in both a computer communications network and a storage area network, comprising mechanisms to migrate a guest from the one server to the other server.

FIG. 2 shows an embodiment for migration of a guest from one server to another by way of a storage area network. Two computing servers 200 and 202 are connected together in a computer communications network by Ethernet 240 and a storage area network (SAN) by a fiber channel 220. The Ethernet network is a primary means by which servers communicate with computers in the network. Thus, computers may access the servers by the communication network. These servers may be found in groups with as many as thousands of servers in a group. In such a group, there are storage servers and there are "computing" servers. Storage servers comprise multiple hard disks and mediate access to the memory on their hard disks. Computing servers are the other non-storage servers in the network such as those that provide access to their files over the Ethernet in response to requests from computers in the network.

Thus, a distinction is made herein between computing servers that perform network services such as receiving and transmitting data over the Ethernet in response to requests from computers in the Ethernet network, and storage servers that provide disks of memory to the computing servers. A computing server may send access requests to a storage server on the fiber channel 220 and data from memory can be transmitted over the fiber channel to the requesting computing server. The computing servers use the Ethernet to otherwise communicate with each other and computers on the Ethernet network.

Thus, embodiments contemplate that there are two networks: the computer communications network, comprising, typically, the Ethernet, and the storage area network (SAN) comprising, typically, a fiber channel or other high speed network. A difference between the two networks is that user computers may connect at will from many locations to the computer communications network to access the servers, but generally do not connect to, and do not have access to, the storage area network. Also, the architecture of the storage area network is simpler than the architecture of the computer communications network, involving simpler commands and faster speed to transfer data from memory of a storage server to memory of a computing server. Thus, it is advantageous to transfer large blocks of memory between servers over the storage area network.

The protocol for the Ethernet channel 240 is typically TCP/IP (Transmission Control Protocol/Internet Protocol). TCP/IP requires a relatively large amount of overhead messaging and large bandwidth. This is because the TCP/IP network must flexibly allow for diverse users to connect to the network from many locations by cable, phone line, and wirelessly. The network of fiber channel 220 is a Storage Area Network (SAN) that uses a protocol suitable for transmitting large amounts of data in block memory transfers. The transfer of data to and from the memory of the storage server is, in one conventional embodiment, performed using SCSI (Small Computer System Interface) protocol. The SCSI standards define commands, protocols, and electrical and optical interfaces. Thus, a storage server communicates with other servers, and these other servers may transfer data between themselves, using the fiber channel 220.

The servers 200 and 202 are non-storage, computing servers that can communicate through the Ethernet channel 240 and the fiber channel 220. They may both separately access one or more storage servers by way of fiber channel 220. In embodiments described herein, one server will be hosting a "guest" when an event will occur that requires the guest to be hosted by another server. For example, it may be necessary to transfer the guest to another server for maintenance or to balance a computing load between multiple servers. A guest may be described as a collection of programs including an operating system and possibly at least one application program that are run together within a partition 204 of the server. For example, a guest may be a running operating system and a running database program that allows user computers connected to the Ethernet network to access the database of the server running the guest.

Associated with the guest will be an IP (Internet Protocol) address and associated with each server is a MAC (Media Access Control) address. When operation of the guest is transferred from a first server to a second server, the guest has the same TCP/IP address as before, but has a different MAC address that it broadcasts on the Ethernet network to let the network know where it is at.

Using conventional techniques, to transfer operation of the guest from a first server 200 to a second server 220, the memory of the guest is transferred over the Ethernet from the first server to the second server. In contrast, in embodiments described herein, the memory of the guest is transferred over the SAN by way of the fiber channel using the same protocol as used when a storage server is accessed. Thus, an event may occur that causes one to want to transfer the operation of a guest from one server to another. Such an event may be for maintenance or to balance a load among servers.

When the event occurs, in a non-live migration mode, operation of the guest on the first server is suspended. The guest's memory on the first server is then transferred to the second server by way of the storage area network. Then operation of the guest is resumed on the second server. In order for the guest to resume operation on the second server from where operation left off on the first server, a relatively small amount of information concerning the state of the guest at the time of its suspension needs to be transmitted from the first server to the second server. The amount of this information is so small that it can be conveniently transferred over the Ethernet. In contrast, the memory used by the guest is voluminous and is more efficiently transmitted over the storage area network.

In a live migration mode, several transfers of memory over the storage area network may occur in the process of transferring guest operation from the first server to the second server. In the live mode, operation of the guest on the first server continues while its memory is being transferred to the second server. When a transfer of all the memory of the guest to the second server is complete, a further transfer then occurs to transfer only those pages of memory that have changed during the last transfer. Thus, the second transfer is more quick and far less voluminous than the first transfer. Yet a third transfer may occur to transfer pages changed during the second transfer. Eventually the process ends when there is no gain to making another transfer. At that time, the guest on the first server is stopped and resumed on the second server.

Both servers in FIG. 2 have a hypervisor 208, 210 to control access to memory 222, 224, of hardware 212, 214. For example, hypervisor 208 will control access to memory 222 and ensure that each partition executing software on the server will access only the memory allocated to it. A hypervisor has direct control over input/output (I/O), is responsible for hosting the I/O to other guests, and responsible for executing hypervisor management applications, such as a migration application. Thus, hypervisor 208, 210 comprises a migration application 230, 236, and a device driver 234, 232.

Migration application 230 will control access to memory from another server. Thus, migration application 230 on server 200 will allow server 202 to access memory 222 to obtain a copy of the memory of a guest on partition 204 of server 200. To do this, device driver 234 will present access to memory 222 through a fiber channel adapter (FCA) 216. FCA 216 is connected to fiber channel 220 which may, for example, use SCSI protocol. Thus, there is a connection from device driver 234 to FCA 216 to fiber channel 220 to FCA 218 of server 202. Device driver 232 receives data from FCA 218 that is received from server 200. Migration application 236 creates and controls access to memory 224.

In one embodiment, therefore, migration application 236 of server 202 will signal over the Ethernet to migration application 230 of server 200 that operation of a guest operating on server 200 is to be transferred from partition 204 of server 200 to partition 206 of server 202. In response, migration application 230 of server 200 will make available to server 202 the memory of the guest in memory 222 of server 200. Driver 234 will act as if the memory of the guest is on a physical disk and will provide access to the virtual disk to server 202. Thus, driver 234 makes it appear to server 202 that it is accessing a disk of a storage server.

The same commands that server 202 would use to retrieve data from a storage server are used to retrieve the contents of the memory of the guest from server 200. This is a major improvement over the conventional method of transferring the memory of the guest over the Ethernet computing network. Transferring over the Ethernet involves the overhead and bandwidth associated with using TCP/IP protocol. In contrast, the storage area network offers quicker transfer due to the higher speed of the network and the relative simplicity of the protocol, and offers lower overhead and transfers data in larger blocks. In short, it is much faster and efficient to transfer the data of the guest memory over the storage area network. Thus, server 200 acts not only as a SAN client, seeking access to memory of a storage server, server 200 also emulates a storage server. As far as server 202 is concerned, it appears as if it is accessing a storage server when it accesses server 200 to get the memory of the guest whose operation is being transferred from server 200 to server 202.

Migration application 230 allows only server 202 to access the guest memory in memory 222 in response to a signal from server 202 indicating the initiation of the transfer of operation of the guest to server 202. When server 200 and server 200 agree to migrate the guest, migration application 230 informs migration application 236 of the virtual disk in server 200 containing the memory of the guest. This information is transmitted over the Ethernet 220. Migration application 236 "sees" the disk emulated by device driver 234. Server 202 now has the ability to read the memory of the guest to be migrated by issuing a read request to the emulated disk.

To transfer the guest memory from server 200 to server 202, migration application 236 reads the entire emulated disk, which is mapped from the "storage server" memory of server 200. If this is a non-live migration, the transfer of memory is now complete and server 202 can initiate the guest. If this is a live migration, server 202 may need to read the disk device in several iterations, because after each read, some contents of the memory of the guest (which is still running) may have changed. To determine which areas of memory have changed, migration application 236 requests this information from migration application 230 over the Ethernet. Migration application 230 responds with a list of memory pages that have changed. Migration application 236 converts the list of pages into disk sectors, and then requests those sectors from the emulated disk on server 200. This process may be performed again if necessary.

Thus, one embodiment comprises first server to migrate a guest operating on the first server to a second server, the first and second server being in the same computer communications network over an Ethernet channel and in the same storage area network over a fiber channel. The first server comprises a memory allocated to store data of the guest on the first server. A network adapter receives over the communications network a signal from the second server indicating that a guest migration operation is to be performed. A processor executes hypervisor computer code comprising a migration program and to execute code of the guest. The migration program executing on the processor presents the memory allocated to the guest as a virtual disk and enables the second server to access the virtual disk on the first server over the storage area network.

Figure 3:
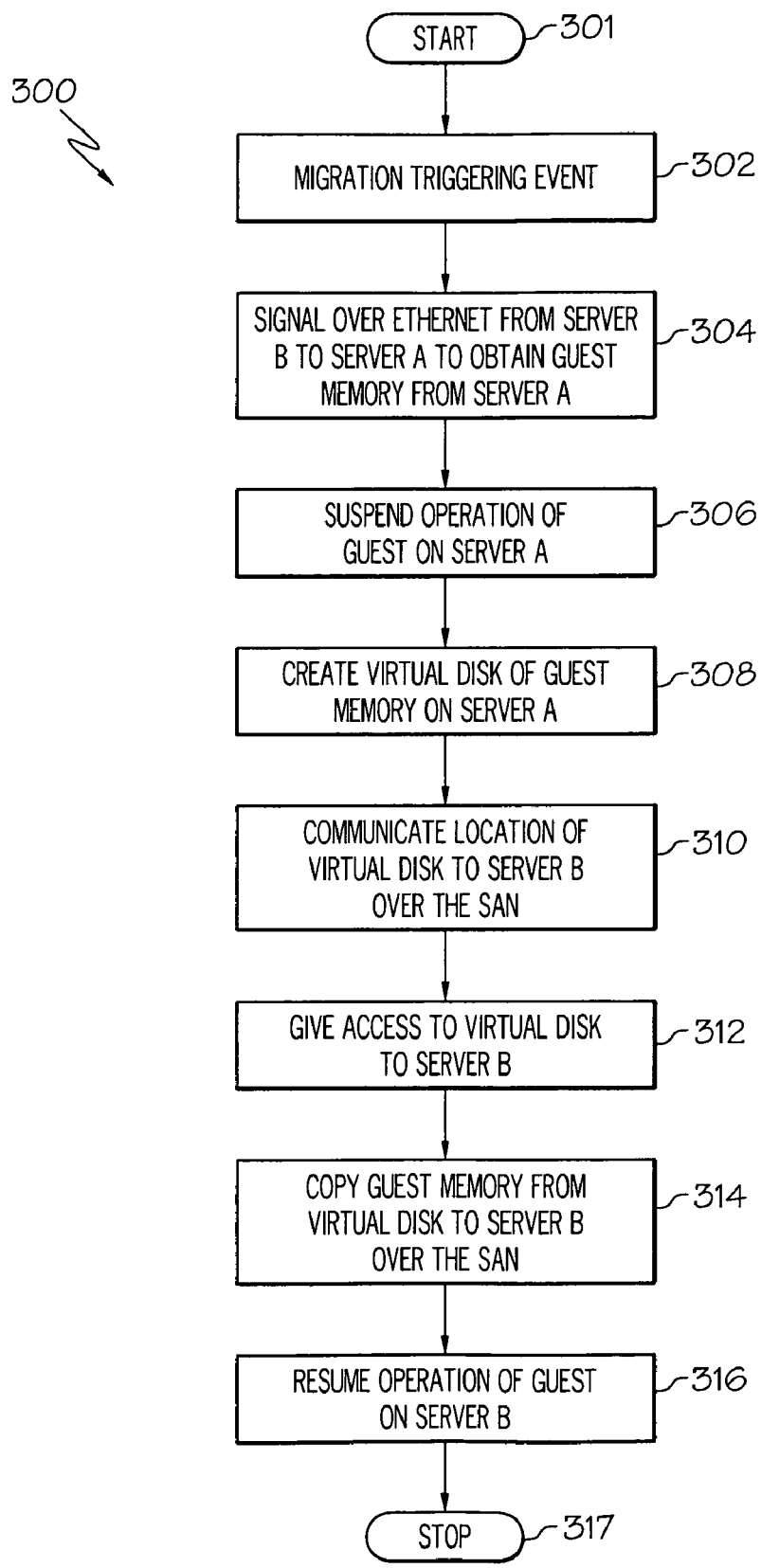
FIG. 3 depicts a flowchart of an embodiment for migration of a guest from a first server to a second server.

FIG. 3 shows a flow chart 300 of an embodiment of a process for transferring operation of a guest from a first server, A, to a second server, B. The process starts at element 301 and ends at element 317. Assume that a guest is operating on server A when a migration triggering event occurs (element 302). A migration triggering event may be for example, a need to perform maintenance on server A. Or it may be desirable to transfer some of the computing load on the servers from server A to server B. When a migration triggering event occurs, server B communicates over the Ethernet to server A, informing server A of an impending transfer of guest operations from server A to server B (element 304). This informs server A to suspend the operation of the guest on server A (element 306).

The hypervisor on server A creates a virtual disk wherein the contents of the disk is the memory being used by the guest on server A (element 308). More precisely, the hypervisor maps pages of memory of the server allocated to the guest into sectors on the virtual disk. In one embodiment, the addresses of the virtual disk are communicated to server B over the SAN (element 310). In another embodiment, this information is transmitted over the computer communications channel, (Ethernet). In response to a read request from server B, the hypervisor of server A allows server B to access the virtual disk containing the guest memory (element 312). Server B, now having direct access to the virtual disk over the SAN, copies the guest memory from the virtual disk to server B (element 314). When copying is complete, the guest resumes operation of the guest on server B (element 316).

Thus, one embodiment is a method for migrating a guest from a first server to a second server in a storage area network (SAN) and in a computer communications network. The method comprises signaling to the first server over the computer communications network that operation of a guest on the first server is to be migrated to the second server. The method comprises creating a virtual disk on the first server having memory being used by the guest on the first server. The method further comprises copying the contents of the virtual disk from the first server to the second server over the storage area network. The method further comprises suspending operation of the guest on the first server, and when copying of the contents of the virtual disk is completed, resuming operation of the guest on the second server.

In some embodiments, a protocol of the computer communication network is TCP/IP and a protocol of the storage area network is SCSI. Copying the contents of the virtual disk comprises issuing a read command over the storage area network from the second server to the first server. In a non-live migration, operation of the guest on the first server is suspended before the contents of the virtual disk are copied to the second server. In a live migration, operation of the guest on the first server continues while the contents of the virtual disk are copied to the second server.

Some embodiments can take the form of an entirely hardware embodiment, an entirely software embodiment or an embodiment containing both hardware and software elements. Some embodiments are thus implemented in software, which includes but is not limited to firmware, resident software, microcode, etc. Furthermore, embodiments can take the form of a computer program product accessible from a machine accessible readable medium providing program code for use by or in connection with a server such as shown in FIG. 1, or any instruction execution system.

For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory 108 employed during actual execution of the program code, bulk storage, and cache memories 102, 190, which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment is a computer program product comprising a computer useable medium having a computer readable program, wherein the computer readable program when executed on a first server causes the server computer to migrate a guest to a second server. The operations comprise receiving a signal from the second server over a computer communications network that operation of the guest on the first server is to be migrated to the second server. The operations further comprise creating on the first server a virtual disk having memory being used by the guest on the first server. The operations further comprise copying the contents of the virtual disk from the first server to the second server over a storage area network. The server suspends operation of the guest on the first server.

In a non-live migration, the first server suspends operation of the guest on the first server before the contents of the virtual disk are copied to the second server. In a live migration, operation of the guest on the first server continues while the contents of the virtual disk are copied to the second server. The first server informs the second server over the computer communications channel, what pages of the memory of the guest have changed since a commencement of copying of the virtual disk from the first server to the second server.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for migrating a guest from a first server to a second server in a storage area network (SAN) and in a computer communications network, comprising:

signaling to the first server over the computer communications network that operation of a guest on the first server is to be migrated to the second server;

creating a virtual disk having memory being used by the guest on the first server, wherein the virtual disk appears to the second server as a hard disk on the first server accessible by the second server over the storage area network;

copying the contents of the virtual disk from the first server to the second server over the storage area network, the copying comprising issuing a command over the storage area network from the second server to the first server, wherein the command comprises a command to read the virtual disk; and suspending operation of the guest on the first server, and in response to completion of copying of the contents of the virtual disk, resuming operation of the guest on the second server.

2. The method of claim 1, wherein a protocol of the computer communication network is TCP/IP and a protocol of the storage area network, over a fiber channel of the storage area network, is SCSI.

3. The method of claim 1, wherein, for a non-live migration, operation of the guest on the first server is suspended before the contents of the virtual disk are copied to the second server.

4. The method of claim 1, wherein, for a live migration, operation of the guest on the first server continues while the contents of the virtual disk are copied to the second server.

5. The method of claim 4, wherein the first server informs the second server over the computer communications channel, what pages of the memory of the guest have changed since a commencement of copying of the virtual disk from the first server to the second server.

6. The method of claim 1, further comprising communicating an address of the memory of the virtual disk from the first server to the second server over the SAN.

7. The method of claim 1, further comprising communicating an address of the memory of the virtual disk from the first server to the second server over the communications network.

8. The method of claim 1, wherein the creating comprises mapping pages of the memory being used by the guest on the first server into sectors on the virtual disk.

9. An apparatus to migrate a guest operating on a first server to a second server, the first server and second server being in a same computer communications network over an Ethernet channel and in a same storage area network over a fiber channel, the first server comprising:

a memory allocated to store data of the guest on the first server;

a network adapter to receive over the communications network a signal from the second server indicating that a guest migration operation is to be performed;

a processor to execute hypervisor computer code comprising a migration program and to execute code of the guest; and a migration program to execute on the processor of the first server to present the memory allocated to the guest as a virtual disk and to enable the second server to access the virtual disk on the first server over the storage area network, wherein the virtual disk appears to the second server as a hard disk on the first server accessible by the second server over the storage area network, wherein the first server receives a command from the second server and in response, transfers the memory of the guest to the second server over the storage area network, wherein the command comprises a command to read the virtual disk.

10. The apparatus of claim 9, wherein, for a non-live migration, operation of the guest on the first server is suspended before the contents of the virtual disk are copied to the second server.

11. The apparatus of claim 9, wherein, for a live migration, operation of the guest on the first server continues while the contents of the virtual disk are copied to the second server.

12. The apparatus of claim 11, wherein the first server informs the second server over the computer communications channel, what pages of the memory of the guest have changed since a commencement of copying of the virtual disk from the first server to the second server.

13. The apparatus of claim 9, wherein the migration program causes the processor to communicate an address of the memory of the virtual disk from the first server to the second server over the communications network.

14. A computer program product comprising a computer readable storage medium having a computer readable program, wherein the computer readable program when executed on a first server causes the first server to:

receive a signal from a second server over a computer communications network that operation of a guest on the first server is to be migrated to the second server;

create a virtual disk having memory being used by the guest on the first server, wherein the virtual disk appears to the second server as a hard disk on the first server accessible by the second server over the storage area network by issuing a command over the storage area network from the second server to the first server, wherein the command comprises a command to read the virtual disk; and copy the contents of the virtual disk from the first server to the second server over a storage area network; and suspend operation of the guest on the first server.

15. The computer program product of claim 14, wherein a protocol of the computer communications network is TCP/IP and a protocol of the storage area network, over a fiber channel of the storage area network, is SCSI.

16. The computer program product of claim 14, wherein, for a non-live migration, the first server suspends operation of the guest on the first server before the contents of the virtual disk are copied to the second server.

17. The computer program product of claim 14, wherein, for a live migration, operation of the guest on the first server continues while the contents of the virtual disk are copied to the second server.

18. The computer program product of claim 17, wherein the first server informs the second server over the computer communications channel, what pages of the memory of the guest have changed since a commencement of copying of the virtual disk from the first server to the second server.

* * * * *